United States Patent [19]
Striegler

[11] 3,866,988
[45] Feb. 18, 1975

[54] BEARING SYSTEM

[75] Inventor: John H. Striegler, Richardson, Tex.

[73] Assignee: Atlantic Richfield Company, New York, N.Y.

[22] Filed: Feb. 26, 1973

[21] Appl. No.: 335,539

[52] U.S. Cl. ............... 308/187.1, 175/92, 175/107, 308/9, 415/503
[51] Int. Cl. ............................................. F16c 33/78
[58] Field of Search ............ 308/9, 184, 187.1, 152, 308/160, 139; 415/502, 503; 175/92, 107

[56] References Cited
UNITED STATES PATENTS

| | | | |
|---|---|---|---|
| 2,626,780 | 1/1953 | Ortloff | 175/107 |
| 2,645,207 | 7/1953 | Bassinger | 175/92 |
| 2,848,285 | 8/1958 | Fischer | 308/187.1 |
| 2,907,611 | 10/1959 | Robinson | 308/187.1 |
| 2,937,007 | 5/1960 | Whittle | 175/107 |
| 3,145,787 | 8/1964 | Brown | 175/107 |
| 3,533,664 | 10/1970 | Dee | 308/9 |
| 3,600,109 | 8/1971 | Pavlichenko et al. | 308/187.1 |
| 3,666,333 | 5/1972 | Dicky | 308/187.1 |
| 3,677,351 | 7/1972 | Geissler | 308/9 |
| 3,722,608 | 3/1973 | Faulk | 175/107 |
| 3,730,284 | 5/1973 | Striegler | 175/92 |

Primary Examiner—Charles J. Myhre
Assistant Examiner—R. H. Lazarus
Attorney, Agent, or Firm—Roderick W. MacDonald

[57] ABSTRACT

A downhole drilling tool containing a liquid bearing means. In one suitable bearing means there is at least one bearing means comprising at least one first seal means and at least one second seal means, the first and second seal means being spaced apart from one another to define an inner chamber so that when said inner chamber is filled with a substantially noncompressible liquid a force can be transmitted between said first and second seal means.

11 Claims, 3 Drawing Figures

PATENTED FEB 18 1975                    3,866,988

BEARING SYSTEM

BACKGROUND OF THE INVENTION

For the purpose of this invention and for discussing the background prior art, the term "unidirectional seal element" or "unidirectional acting seal element" is meant to encompass all seal elements which when in operation will perform a sealing function when forced in one direction but will not perform a sealing function when forced in the opposite direction. Such sealing elements are known in the art and variously referred to as chevron seals, U-cup seals, lip seals, and the like. Heretofore, in bearing systems employed in downhole drilling tools mechanical bearings have been employed together with unidirectional acting seal elements to keep fluids such as drilling mud away from the bearings of the tool.

An example of the prior art use of unidirectional seal elements is found in U.S. Pat. No. 2,626,780, the disclosure of which is incorporated herein by reference, which shows in FIG. 2 chevron seal elements 19 carried on either end of a bearing chamber containing mechanical bearing 16. All seal elements 19 are oriented away from the bearings so that drilling mud tending to pass toward the bearings will be stopped by the chevron seal elements. Conversely, liquid trying to flow away from the bearings would pass by the chevron seal elements since they are unidirectional acting and are oriented in a direction away from the bearings.

SUMMARY OF THE INVENTION

According to this invention a liquid bearing is employed in a downhole drilling tool. One type of suitable liquid bearing includes first and second spaced apart seal means which are employed in a manner which keeps a substantially noncompressible liquid inside an inner chamber to thereby provide the liquid bearing means.

Since the seal means of the bearing of this invention are spaced apart by a liquid, contact of relatively moving solid surfaces is substantially omitted and the bearing life thereby increased.

Other liquid bearings which are known in other arts can also be employed in the downhole tool of this invention.

Although not required, if desired, one or more mechanical bearing means can be employed in the inner chamber between the first and second seal means either to provide a force transmission function when the fluid bearing of this invention is in operation, thereby dividing the load between the mechanical and liquid bearings, or to provide a force transmission function only when the liquid bearing has failed, such as by loss of liquid from the inner chamber.

Accordingly, it is an object of this invention to provide a new and improved downhole tool bearing system. It is another object to provide a new and improved well drilling apparatus. It is another object to provide a new and improved downhole drilling tool. It is another object to provide a new and improved nonmechanical bearing. It is another object to provide a new and improved thrust bearing. It is another object to provide a new and improved thrust bearing for a downhole drilling tool.

Other aspects, objects and advantages of this invention will be apparent to those skilled in the art from this disclosure and the appended claims.

DETAILED DESCRIPTION OF THE INVENTION

Figure 1:
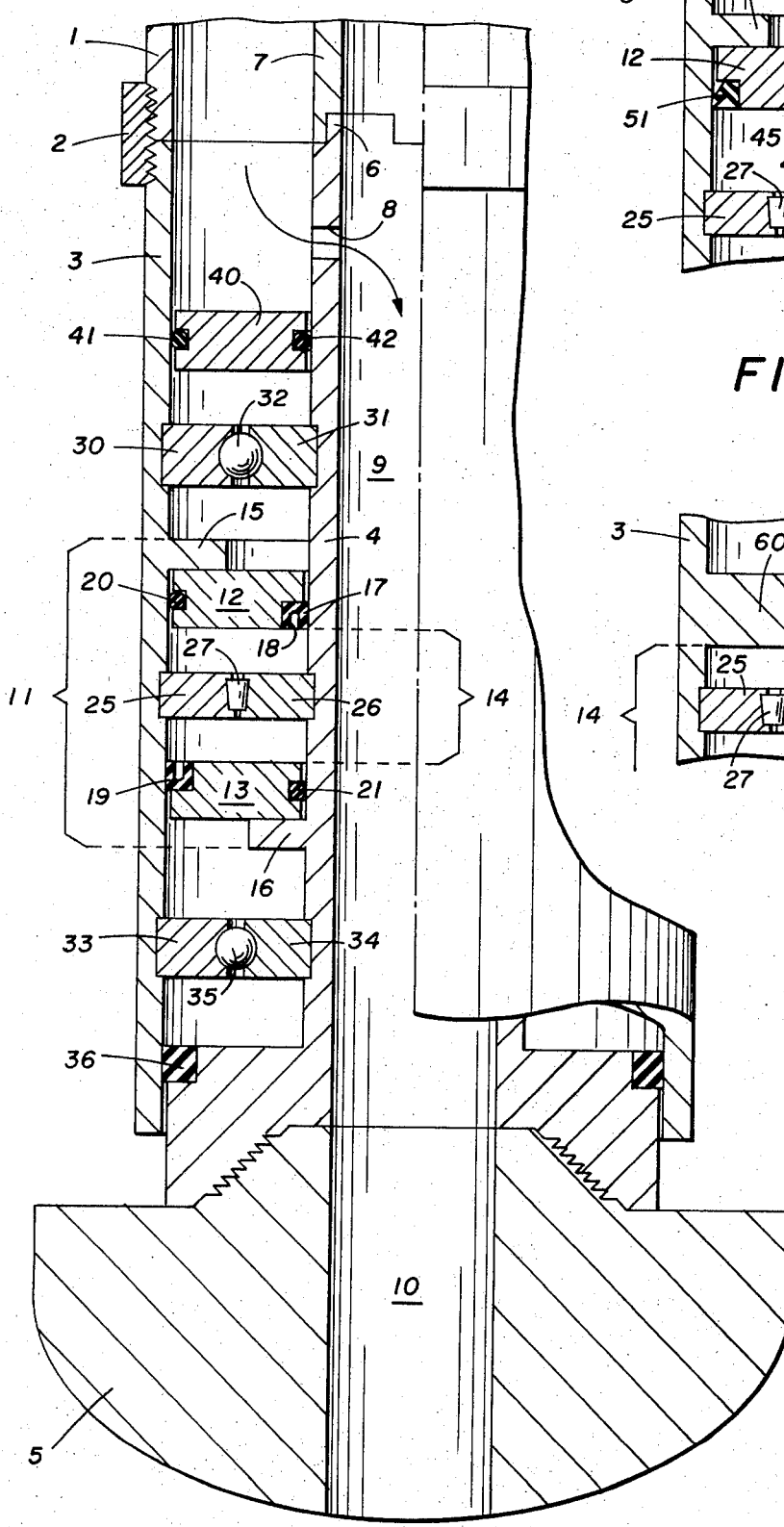
FIG. 1 shows apparatus employing one embodiment of this invention.

More specifically, FIG. 1 shows a partial cross section of a downhole tool which can be used to drill a wellbore in a conventional manner as is fully and completely set forth in U.S. application Ser. No. 158,713 now U.S. Pat. No. 3,730,284, filed July 1, 1971, of common assignee, the disclosure of which is incorporated herein by reference.

FIG. 1 shows the lower end 1 of a section of drill pipe which is connected by way of coupling 2 to housing 3. Housing 3 is concentric with and spaced from shaft 4. At its lower end shaft 4, by a threaded connection, carries bit 5, while at its upper end shaft 4 is connected by a series of splines 6 to the driven shaft 7 of a conventional downhole motor (not shown). Shaft 4 has at least one aperture 8 therein to admit drilling fluid, after passing through or by the downhole motor, to enter interior 9 of shaft 4 and to pass through conduit 10 of bit 5. From conduit 10 the drilling fluid passes out and around bit 5 and upwardly in the borehole past the outside of housing 3 and the drill pipe above housing 3. The annular chamber formed between shaft 4 and housing 3 contains a thrust bearing in accordance with this invention and designated by the bracket 11. This invention can be applied to bearings other than thrust bearings, if desired.

The liquid bearing 11 of this invention is composed of a first seal means 12 and a second seal means 13, the two seal means being spaced apart to define an inner chamber 14 therebetween. The seal means are movable within the annular chamber but coact with the housing and shaft in such a way that a force can be transmitted between the housing and the shaft by way of the first and second seal means and through the liquid in inner chamber 14.

In the embodiment of FIG. 1, first seal means 12 coacts with housing 3 by abutting shoulder 15 while seal means 13 coacts with shaft 4 by abutting shoulder 16. Thus, a force passing upwardly in shaft 4 will be transmitted to housing 3 by passing, respectively, through shoulder 16, seal means 13, the liquid in inner chamber 14, seal means 12, and finally through shoulder 15 into housing 3. The reverse trail is followed by a force passing downwardly in housing 3 when transmitted to shaft 4. Instead of single seal means 12, the upper or first seal means can be a plurality of individual seal means 12, the same being true with second or lower seal means 13.

Seal means 12 carries at its sealing interface with shaft 4 a unidirectional acting seal element 17, which in the embodiment of FIG. 1 is a conventional elastic, e.g., rubber, U-cup seal. Seal element 17 performs its sealing function when a fluid approaches the seal element from the side which contains seal element cavity 18. Thus, when a liquid in inner chamber 14 approaches seal element 17 on its way toward an upper part of the annular chamber, the liquid will force at least a part of seal element 17 tightly against shaft 4 thereby preventing the escape of that liquid from inner chamber 14. Seal element 17, being a unidirectional acting sealing element, does not perform the same sealing function as just described when liquid above seal means 12 attempts to flow into inner chamber 14. However, such a flow of liquid into inner chamber 14 is prevented as long as inner chamber 14 is liquid full. It can be seen that in this embodiment inner chamber 14 can be automatically refilled if it should lose some of its original bearing liquid.

Second seal means 13 also carries at its sealing interface with housing 3 a unidirectional acting seal element 19 which is oriented toward inner chamber 14 in the same manner as seal element 17 and thereby provides the same sealing function as above-described for element 17.

Seal means 12 is shown in the embodiment of FIG. 1 to be an annular ring which is slidably carried in the annular chamber and which abuts the lower side of shoulder 15 while seal means 13 abuts an opposing shoulder 16 carried by shaft 4. Thus, seal means 12 coacts with housing 3 while seal means 13 coacts with shaft 4. Conversely, seal means 12 could be made to coact with shaft 4 and carry seal element 17 at the sealing interface between seal means 12 and housing 3. In such a case seal means 13 would be made to coact with shaft 3 and carry seal element 19 at the sealing interface between seal element 13 and shaft 4. To act as a thrust or other type of bearing between the housing and shaft, either the first or second seal means must coact with either housing 3 or shaft 4 and the second seal means must coact with whichever of the housing or shaft the first seal means does not coact with.

Figure 2:
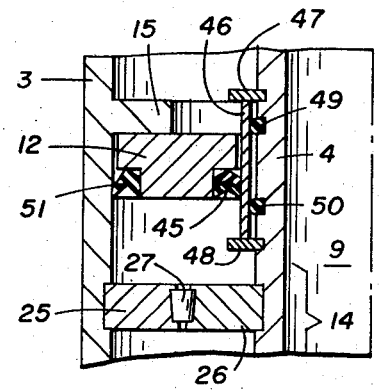
FIG. 2 shows one embodiment of a seal means useful in this invention.
Figure 3:
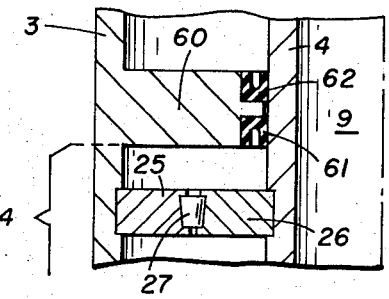
FIG. 3 shows another embodiment of a seal means useful in this invention.

The seal means can be physically attached to whichever of the housing or shaft that particular seal means coacts with as shown in FIG. 3. When the seal means is not physically attached to the member with which it coacts, it is preferable to have some sort of seal element between the seal means and the member with which it coacts. In the embodiment of FIG. 1, an O-ring 20 is employed as the seal element between seal means 12 and housing 3. Other seal elements such as the unidirectional acting seal elements above-described can be used in lieu of O-ring 20 as shown in FIG. 2. Similarly, an O-ring seal element 21 is employed in seal means 13 adjacent to the member with which that seal element coacts, i.e., shaft 4.

Of course, a plurality of seal elements can be employed on each individual seal means as shown in FIG. 3, and/or a plurality of individual seal means can be employed as the first seal means and/or as the second seal means. For example, for the first seal means of FIG. 1, two or more seal means 12 can be employed contiguous with one another below shoulder 15 and at the top of inner chamber 14, and each individual seal means can contain one or two or more seal elements in the same or varying orientations. The seal elements can be oriented in various directions so that part of the seal element in a given seal means are oriented toward inner chamber 14 like seal element 17 and the remainder of the seal elements in that same seal means are oriented in the opposite direction to inner chamber 14. Similar reasoning applies to the second seal means of FIG. 1.

The combination of elements comprised of at least one first seal means and at least one second seal means, each seal means carrying one or more seal elements, said first and second seal means being spaced apart by an inner chamber filled with a substantially noncompressible liquid, constitutes a liquid bearing in accordance with this invention which when made to coact between two members such as housing 3 and shaft 4 will serve as a bearing means between those two members. The seal elements of each of the first and second seal means which are oriented toward the inner chamber serve to keep liquid in the inner chamber even though substantial compressive forces are applied to the liquid in that chamber when serving as a bearing.

Thus, inner chamber 14 can be empty except for the substantially noncompressible liquid therein. However, if desired, and although not required for the liquid bearing of this invention, one or more mechanical bearings can be employed in inner chamber 14. In the embodiment of FIG. 1, a combination thrust and lateral bearing is shown to be carried in inner chamber 14 in the form of race 25 carried by housing 3, race 26 carried by shaft 4, and roller bearings 27 carried between races 25 and 26. If the optional mechanical bearing or bearings within inner chamber 14 are employed, they can be employed to operate while the liquid bearing 11 is operating thereby splitting the load between the mechanical and liquid bearings, or can be employed to operate only should the liquid bearing fail such as by loss of liquid from inner chamber 14 thereby preventing shutdown of the tool should catastrophic loss of liquid from inner chamber 14 be experienced. When mechanical bearings are employed in inner chamber 14, it is desirable that the substantially non-compressible liquid employed in chamber 14 be or contain a lubricant for the mechanical bearings.

Two or more liquid bearings 11 can be employed in a single tool or other device and in each of those liquid bearings two or more seal means 12 can be employed in the first seal means and two or more seal means 13 can be employed in the second seal means, each individual seal means 12 and 13 carrying one or two or more seal elements.

When two or more liquid bearings are employed in a single tool, the first seal means of each liquid bearing should be made to coact with the same member. For example, the first seal means of the lowest liquid bearing could be made to coact with housing 3 as shown in FIG. 1, in which case all the liquid bearings would have their first seal means coacting with housing 3. In such a situation, in each liquid bearing the second seal means would have to coact with shaft 4 as shown in FIG. 1.

Mechanical bearings are employed on either side of liquid bearing 11 in FIG. 1 to keep housing 3 and shaft 4 in substantially parallel alignment. For example, in FIG. 1, above shoulder 15, housing 3 carries a race 30 while shaft 4 carries an opposing race 31, races 30 and 31 having ball bearings 32 therebetwen. Similarly, below shoulder 16 housing 3 carries race 33 while shaft 4 carries opposing race 34 with ball bearings 35 therebetween. These ball bearings can be exposed to the drilling fluid.

If desired to protect these ball bearings from drilling fluid and to provide a lubrication reservoir for same, face seal 36 can be employed between shaft 4 and housing 3 and the space below seal means 13 and above face seal 36 filled with a lubricant for the bearing in that space. Similarly, an annular movable piston 40 with O-ring seal elements 41 and 42 at the sealing interfaces with housing 3 and shaft 4, respectively, can be employed above bearing means 30–32 and the space above seal means 12 and below piston 40 filled with a lubricant for that bearing. It should be stressed, however, that just as with mechanical bearings 25–27, seal means 40 and 36 are strictly optional and not required for the operation of this invention.

FIG. 2 shows a partial section of the apparatus of FIG. 1 but modified in that U-cup seal element 17 has been replaced by a plurality of chevron seal elements 45, O-ring 20 has been replaced by lip seal 51 oriented toward inner chamber 14, and a sealing surface means is employed in the sealing interface between seal means 12 and shaft 4. The sealing surface means in this embodiment is composed of a right cylindrical member 46 which is held between upper and lower shoulders 47 and 48, respectively, the shoulders being fixed to shaft 4. Member 46 is carried in a sealing manner by shaft 4 by virtue of the fact that O-ring seal elements 49 and 50 are carried at the sealing interface between member 46 and shaft 4. On the opposite side of member 46 from seal elements 49 and 50, the sealing interface between seal means 12 and member 46 is perfected by the use of a plurality of unidirectional acting chevron seal elements 45.

The use of a sealing surface means is advantageous in that even if there are deviations from parallel between housing 3 and shaft 4, the sealing surface member 46, being laterally movable in a sealed manner, can adjust to these deviations from parallel by deformation of seal elements, e.g., seal elements 49 and 50, and thereby provide a substantially flat, nondeviated sealing surface for seal elements 45. This insures that seal means 12 will perform its sealing function notwithstanding lateral displacement of the housing and/or shaft. Such a sealing surface means can be employed with one or all of the seal elements of the first seal means and/or the second seal means as desired.

FIG. 3 shows a modification of the seal means of FIG. 1 wherein seal means 60 is made physically integral with housing 3 and carries not only a seal element 61 which is oriented toward inner chamber 14 but also an additional seal element 62 which is oriented away from inner chamber 14 and toward the upper part of the annular chamber. In this way, liquid cannot pass out of inner chamber 14 because of seal element 61 and liquid cannot pass into inner chamber 14 because of seal element 62. Of course, if desired, seal means 60 can be split into two physically separate rings, the upper ring carrying seal element 62 and the lower ring carrying seal element 61.

The liquid in inner chamber 14 can be any substantially noncompressible liquid which would include as well as lubricating oils, the drilling fluid employed in drilling a well, water, and other conventional liquids.

Other liquid bearings such as a first annular member which fits into a corresponding annular depression in a second member, the first member having conduits in said annular member for forcing liquid into the depression and between the first and second members to provide the liquid bearing can be employed in lieu of the liquid bearing of FIGS. 1–3 if desired.

Reasonable variations and modifications are possible within the scope of this disclosure without departing from the spirit and scope of this invention.

The embodiments of the invention in which an exclusive property or privilege is claimed are defined as follows:

1. In a well drilling tool whereby a drill bit is rotated in the earth on a downhole motor shaft means to drill a wellbore, a housing carried concentric with said shaft and spaced therefrom thereby providing an annular chamber between said housing and shaft, the improvement comprising at least one liquid thrust bearing means operably connected between said housing and shaft in said annular chamber, said at least one liquid bearing means comprising at least one first seal means, at least one second seal means, said first and second seal means being spaced apart to define an inner chamber therebetween, said first seal means coacting with one of said housing and shaft, said second seal means coacting with whichever of said housing and shaft said first seal means does not coact with, whereby a force can be transmitted between said housing and shaft by way of said first and second seal means and through said inner chamber, and said first and second seal means are adapted to keep a liquid within said inner chamber.

2. A tool according to claim 1 wherein there is at least one seal element carried by each of said first and second seal means, said seal elements being adapted to prevent liquid in said inner chamber from passing by said seal means and into the part of said annular chamber which is external to said inner chamber.

3. A tool according to claim 2 wherein said first and second seal means each carry at least one additional seal element, said additional seal elements being adapted to prevent liquid in said annular chamber but outside said inner chamber from passing by said seal means and into said inner chamber.

4. A tool according to claim 2 wherein said seal elements are unidirectional acting seal elements which are oriented toward said inner chamber.

5. A tool according to claim 3 wherein said additional seal elements are unidirectional acting seal elements which are oriented away from said inner chamber.

6. A tool according to claim 4 wherein said seal elements are one of chevron seals, U-cup seals, and lip seals.

7. A tool according to claim 5 wherein said additional seal elements are one of chevron seals, U-cup seals, and lip seals.

8. A tool according to claim 2 wherein there are a plurality of first seal means and a plurality of second seal means.

9. A tool according to claim 1 wherein there is at least one mechanical bearing means carried in said inner chamber for transmitting a force between said shaft and housing only after a substantial amount of liquid leaks out of said inner chamber.

10. A tool according to claim 1 wherein sealing surface means is laterally movably carried at the sealing interface of at least one of said first and second seal means.

11. A tool according to claim 2 wherein sealing surface means is laterally movably carried at the sealing interface of at least one of said first and second seal means.

* * * * *